United States Patent
Capuzzi et al.

(10) Patent No.: US 12,414,564 B2
(45) Date of Patent: Sep. 16, 2025

(54) FUNGICIDE FORMULATIONS WITH REDUCED CRYSTAL GROWTH

(71) Applicant: SYNGENTA CROP PROTECTION AG, Basel (CH)

(72) Inventors: Giulia Capuzzi, Greensboro, NC (US); Sejong Kim, Greensboro, NC (US); Manoj Varshney, Greensboro, NC (US)

(73) Assignee: SYNGENTA CROP PROTECTION AG, Basel (CH)

(*) Notice: Subject to any disclaimer, the term of this patent is extended or adjusted under 35 U.S.C. 154(b) by 862 days.

(21) Appl. No.: 17/593,701

(22) PCT Filed: Feb. 24, 2020

(86) PCT No.: PCT/EP2020/054741
§ 371 (c)(1),
(2) Date: Sep. 23, 2021

(87) PCT Pub. No.: WO2020/193035
PCT Pub. Date: Oct. 1, 2020

(65) Prior Publication Data
US 2022/0167617 A1 Jun. 2, 2022

Related U.S. Application Data

(60) Provisional application No. 62/824,804, filed on Mar. 27, 2019.

(51) Int. Cl.
| *A01P 3/00* | (2006.01) |
| *A01N 25/02* | (2006.01) |
| *A01N 43/54* | (2006.01) |
| *A01N 43/56* | (2006.01) |
| *A01N 43/80* | (2006.01) |

(52) U.S. Cl.
CPC ............ *A01N 43/56* (2013.01); *A01N 25/02* (2013.01); *A01N 43/54* (2013.01); *A01N 43/80* (2013.01); *A01P 3/00* (2021.08)

(58) Field of Classification Search
CPC ........ A01N 43/56; A01N 43/54; A01N 43/80; A01N 25/02; A01P 3/00
See application file for complete search history.

(56) References Cited

U.S. PATENT DOCUMENTS

| 10,405,546 B2 | 9/2019 | Damaceno et al. |
| 10,925,279 B2 | 2/2021 | Fowler |
| 2006/0030486 A1 | 2/2006 | Meyer et al. |
| 2007/0184983 A1 | 8/2007 | Finch et al. |
| 2008/0193534 A1 | 8/2008 | Lindfors et al. |
| 2010/0210461 A1† | 8/2010 | Stoesser et al. |
| 2010/0234230 A1 | 9/2010 | Fowler |
| 2018/0289005 A1 | 10/2018 | Hoffman et al. |
| 2019/0082695 A1* | 3/2019 | Gewehr ............... A01N 43/713 |

FOREIGN PATENT DOCUMENTS

| CN | 1980572 A | 6/2007 |
| CN | 101242809 A | 8/2008 |
| CN | 101534637 A | 9/2009 |
| CN | 101848639 A | 9/2010 |
| CN | 102245025 A | 11/2011 |
| CN | 102342285 A | 2/2012 |
| CN | 109354677 A | 2/2019 |
| JP | 2010533683 A | 10/2010 |
| WO | 0035284 A1 | 6/2000 |
| WO | 2006002984 † | 1/2006 |
| WO | 2007021228 A1 | 2/2007 |
| WO | 2009013247 A2 | 1/2009 |
| WO | 2009112836 A2 | 9/2009 |
| WO | 2010078852 A1 | 7/2010 |
| WO | 2019052930 † | 3/2019 |

OTHER PUBLICATIONS

Kruse et al., "Evonik: New Multifunctional Additive for Sophisticated Formulations", May 2017, Agropages, Formulation & Adjuvant Technology, pp. 15-17. (Year: 2017).*

Kruse, et al., "Evonik: New Multifunctional Additive for Sophisticated Formulations", Agropages, 2017 Formulations & Adjuvant Technology, pp. 15-17, 2017.

Written Opinion of the International Searching Authority and International Search Report for PCT/EP2020/054741, mailed Apr. 28, 2020.

Kruse et al., Evonik: New Multifunctional Additive for Sophisticated Formulations, Agropages, 2017 Formulation & Adjuvant Technology, May 2017, p. 15-17.†

* cited by examiner
† cited by third party

*Primary Examiner* — Michael B. Pallay
(74) *Attorney, Agent, or Firm* — BakerHostetler; Toni-Junell Herbert

(57) ABSTRACT

This invention relates to a composition comprising a compound of formula (I) and an agrochemical active ingredient selected from ADEPIDYN™ (pydiflumetofen), oxathiapiprolin, sedaxane and azoxystrobin; $R_1O[C(R_2)(H)C(R_3)(H)O]_nX$ (I), where $R_1$ is $C_{6-12}$ alkyl or is $C_{6-12}$ alkenyl; n is from 5 to 50; independently, each $[C(R_2)(H)C(R_3)(H)O]$ unit has both $R_2$ and $R_3$ being hydrogen or has one of $R_2$ and $R_3$ being hydrogen and the other being phenyl; provided that at least one $[C(R_2)(H)C(R_3)(H)O]$ unit has one of $R_2$ and $R_3$ being hydrogen and the other being phenyl; and X is hydrogen or is selected from $C_{1-4}$ alkyl; and to use of a compound of formula (I) to reduce particle growth (such as nucleation, crystal growth or Ostwald ripening) of an agrochemical active ingredient.

12 Claims, No Drawings

FUNGICIDE FORMULATIONS WITH REDUCED CRYSTAL GROWTH

CROSS-REFERENCE TO RELATED APPLICATIONS

This application is a 371 National Stage application of International Application No. PCT/EP2020/054741 filed Feb. 24, 2020, which claims priority to U.S. 62/824,804 filed Mar. 27, 2019, the entire contents of these applications are hereby incorporated by reference.

This invention relates to a composition comprising a compound of formula (I) and an agrochemical active ingredient selected from ADEPIDYN™ (pydiflumetofen), oxathiapiprolin, sedaxane and azoxystrobin;

(I)

where $R_1$ is $C_{6-12}$ alkyl or is $C_{6-12}$ alkenyl;
n is from 5 to 50;
independently, each $[C(R_2)(H)C(R_3)(H)O]$ unit has both $R_2$ and $R_3$ being hydrogen or has one of $R_2$ and $R_3$ being hydrogen and the other being phenyl; provided that at least one $[C(R_2)(H)C(R_3)(H)O]$ unit has one of $R_2$ and $R_3$ being hydrogen and the other being phenyl;
and X is hydrogen or is selected from $C_{1-4}$ alkyl;
and to use of a compound of formula (I) to reduce particle growth (such as nucleation, crystal growth or Ostwald ripening) of an agrochemical active ingredient.

Agrochemical compositions may undergo undesirable particle growth, such as crystal growth, nucleation or Ostwald ripening, when stored for periods of time (for example, in a distributor's warehouse or in a farmer's store), particularly in situations where there is an oscillating temperature (such as freeze-thaw cycling). Such behaviour may lead to adverse performance of the agrochemical compositions (including separation, sedimentation, caking within an agrochemical concentrate; blocking of spray nozzles during attempted application of the agrochemical, either in concentrated form or in a diluted form; and poor biological performance of the agrochemical, possibly due to limited availability of the agrochemical to its intended biological site due to large particle sizes, which have a smaller surface are to volume ratio than corresponding smaller particles and hence a reduced bioavailability).

Surprisingly, it has now been found that certain ethylene oxide-styrene oxide copolymer monoalkyl ether polymers may reduce or overcome the crystal growth behaviour and hence the associated physical and biological problems.

Certain compositions comprising an ethylene oxide-styrene oxide copolymer monoalkyl ether polymer and particular agrochemical active ingredients are novel.

Compounds of formula (I) are known only as wetting agents; not as crystal growth inhibitors.

Therefore, the present invention provides a composition comprising a liquid continuous phase, a compound of formula (I) and an agrochemical active ingredient selected from pydiflumetofen, oxathiapiprolin, sedaxane and azoxystrobin;

(I)

where $R_1$ is $C_{6-12}$ alkyl or is $C_{6-12}$ alkenyl;
n is from 5 to 50;
independently, each $[C(R_2)(H)C(R_3)(H)O]$ unit has both $R_2$ and $R_3$ being hydrogen or has one of $R_2$ and $R_3$ being hydrogen and the other being phenyl; provided that at least one $[C(R_2)(H)C(R_3)(H)O]$ unit has one of $R_2$ and $R_3$ being hydrogen and the other being phenyl; and X is hydrogen or is selected from $C_{1-4}$ alkyl.

This means that each unit in the moiety $[C(R_2)(H)C(R_3)(H)O]_n$ has the formula $[C(R_2)(H)C(R_3)(H)O]$ but each unit is independently selected from the following options: $R_2$ is hydrogen and $R_3$ is hydrogen; or $R_2$ is hydrogen and $R_3$ is phenyl; or $R_2$ is phenyl and $R_3$ is hydrogen; provided that at least one $[C(R_2)(H)C(R_3)(H)O]$ unit has $R_2$ is hydrogen and $R_3$ is phenyl; or $R_2$ is hydrogen and $R_3$ is phenyl.

The moiety $[C(R_2)(H)C(R_3)(H)O]n$ is a random co-polymer; or a block co-polymer.

Preferably n is from 5 to 40 (more preferably from 5 to 20).

Preferably X is hydrogen.

Alkyl and alkenyl chains may be linear or branched.

Suitably $R_1$ is $C_{6-12}$ alkyl; more suitably $R_1$ is $C_{8-10}$ alkyl; even more suitably $R_1$ is $C_8$ alkyl.

Suitably the compound of formula (I) is a compound of formula (Ia)

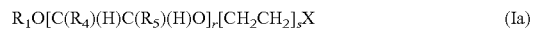
(Ia)

where, independently, in each $C(R_4)(H)C(R_5)(H)O$ unit $R_4$ is hydrogen and $R_5$ is phenyl; or $R_4$ is phenyl and $R_5$ is hydrogen; r is from 1 to 25; and s is from 1 to 25; and $R_1$ is as above or below.

Preferably r is from 1 to 10 (more preferably from 3 to 7).
Preferably s is from 1 to 10 (more preferably from 3 to 7).
Suitably n is an average (mean, median or modal) value.

In another aspect, the present invention provides a novel use of a compound of formula (I) as defined above or below to reduce particle growth (such as nucleation, crystal growth or Ostwald ripening) in a composition comprising a liquid continuous phase and an agrochemical active ingredient.

The composition may be a solution of an agrochemical (such as a soluble concentrate (SL) or an emulsifiable concentrate (EC)); a suspension of a solid (at room temperature) agrochemical in a liquid continuous phase (either water (SC) or oil (OD)); an emulsion where droplets comprising an agrochemical are dispersed in a liquid continuous phase (either water (EW) or oil (EO)); or may be a suspoemulsion (SE).

The composition may further comprise a surfactant. It is possible that the presence of a surfactant may increase the likelihood of the nucleation, crystal growth or Ostwald ripening behaviour which the compound of formula (I) is used to reduce. Surfactants are compounds which reduce the surface tension of water. Examples of surfactants are ionic (anionic, cationic or amphoteric) and nonionic surfactants.

The noun "agrochemical" and term "agrochemically active ingredient" are used herein interchangeably, and include herbicides, insecticides, nematicides, molluscicides, fungicides, plant growth regulators and safeners; preferably herbicides, insecticides and fungicides.

An agrochemical, or a salt of an agrochemical, selected from those given below, may be suitable for the present invention.

Suitable herbicides include pinoxaden, bicyclopyrone, mesotrione, fomesafen, tralkoxydim, napropamide, amitraz, propanil, pyrimethanil, dicloran, tecnazene, toclofos methyl, flamprop M, 2,4-D, MCPA, mecoprop, clodinafop-propargyl, cyhalofop-butyl, diclofop methyl, haloxyfop, quizalofop-P, indol-3-ylacetic acid, 1-naphthylacetic acid, isoxaben, tebutam, chlorthal dimethyl, benomyl, benfuresate, dicamba, dichlobenil, benazolin, triazoxide, fluazuron, teflubenzuron, phenmedipham, acetochlor, alachlor, metolachlor, pretilachlor, thenylchlor, alloxydim, butroxydim, clethodim, cyclodim, sethoxydim, tepraloxydim, pendimethalin, dinoterb, bifenox, oxyfluorfen, acifluorfen, fluazifop, S-metolachlor, glyphosate, glufosinate, paraquat, diquat, fluoroglycofen-ethyl, bromoxynil, ioxynil, imazamethabenz-methyl, imazapyr, imazaquin, imazethapyr, imazapic, imazamox, flumioxazin, flumiclorac-pentyl, picloram, amodosulfuron, chlorsulfuron, nicosulfuron, rimsulfuron, triasulfuron, triallate, pebulate, prosulfocarb, molinate, atrazine, simazine, cyanazine, ametryn, prometryn, terbuthylazine, terbutryn, sulcotrione, isoproturon, linuron, fenuron, chlorotoluron, metoxuron, iodosulfuron, mesosulfuron, diflufenican, flufenacet, fluroxypyr, aminopyralid, pyroxsulam, XDE-848 Rinskor and halauxifen-methyl.

Suitable fungicides include isopyrazam, mandipropamid, azoxystrobin, trifloxystrobin, kresoxim methyl, mefenoxam, famoxadone, metominostrobin and picoxystrobin, cyprodanil, carbendazim, thiabendazole, dimethomorph, vinclozolin, iprodione, dithiocarbamate, imazalil, prochloraz, fluquinconazole, epoxiconazole, flutriafol, azaconazole, bitertanol, bromuconazole, cyproconazole, difenoconazole, hexaconazole, paclobutrazole, propiconazole, tebuconazole, triadimefon, trtiticonazole, fenpropimorph, tridemorph, fenpropidin, mancozeb, metiram, chlorothalonil, thiram, ziram, captafol, captan, folpet, fluazinam, flutolanil, carboxin, metalaxyl, bupirimate, ethirimol, dimoxystrobin, fluoxastrobin, orysastrobin, metominostrobin, prothioconazole, adepidyn, bixafen, fludioxinil, fluxapyroxad, prothioconazole, pyraclostrobin, revysol, solatenol and xemium.

Suitable insecticides include thiamethoxam, imidacloprid, acetamiprid, clothianidin, dinotefuran, nitenpyram, fipronil, abamectin, emamectin, tefluthrin, emamectin benzoate, bendiocarb, carbaryl, fenoxycarb, isoprocarb, pirimicarb, propoxur, xylylcarb, asulam, chlorpropham, endosulfan, heptachlor, tebufenozide, bensultap, diethofencarb, pirimiphos methyl, aldicarb, methomyl, cyprmethrin, bioallethrin, deltamethrin, lambda cyhalothrin, cyhalothrin, cyfluthrin, fenvalerate, imiprothrin, permethrin, halfenprox, chlorantraniliprole, oxamyl, flupyradifurone, sedaxane, inscalis, rynaxypyr, sulfoxaflor and spinetoram.

Suitable plant growth regulators include paclobutrazole, trinexapac-ethyl and 1-methylcyclopropene.

Suitable safeners include benoxacor, cloquintocet-mexyl, cyometrinil, dichlormid, fenchlorazole-ethyl, fenclorim, flurazole, fluxofenim, mefenpyr-diethyl, MG-191, naphthalic anhydride and oxabetrinil.

The various editions of The Pesticide Manual [especially the 14th and 15th editions] also disclose details of agrochemicals, any one of which may suitably be used in the present invention.

Suitably the agrochemical is present in the composition at a concentration of from 0.5% to 50.0% (more suitably from 1.0% to 30%; more suitably from 3.0% to 20.0%; most suitably from 5.0% to 15.0%) by weight.

Suitably the agrochemical is in suspended form in the continuous phase.

Suitably, the agrochemical is ADEPIDYN™ (pydiflumetofen), oxathiapiprolin, sedaxane or azoxystrobin.

Suitably the continuous phase is aqueous.

A further agrochemical may be present in the composition of the present invention.

Suitably the further agrochemical is present in the composition at a concentration of from 0.5% to 50.0% (more suitably from 1.0% to 30%; more suitably from 3.0% to 20.0%; most suitably from 5.0% to 15.0%) by weight.

Suitably the first agrochemical is in suspended form in the continuous phase whilst the further agrochemical is present in an emulsified form.

When more than one agrochemical is present, preferably ADEPIDYN™ (pydiflumetofen) is in suspended form whilst propiconazole is present as an emulsion; or oxathiapiprolin is in suspended form whilst mefenoxam is present as an emulsion. In such a situation, suitably the continuous phase is aqueous and the composition is a suspoemulsion.

Suitably the compound of formula (I) is present in the composition at a concentration of from 0.1% to 10.0% (more suitably from 0.3% to 5.0%; more suitably from 0.5% to 2.0%; most suitably from 0.5% to 1.0%) by weight.

The following examples demonstrate the crystal growth associated with compositions according to the present invention. Unless otherwise stated, all concentrations and ratios are by weight.

Particle size distribution is reported as the number of particles that fall into each of the various size ranges, given as a percentage of the total number of all sizes in the sample of interest.

Hence, DV95 (for instance) reports cumulative data; 95 means up to 95% percent of the total particles are smaller than a given number. For example if DV 95=7 μm, it means that 95% of the particles are smaller than 7 μm and 5% bigger than 7 μm.

Break-Thru™ DA647 and Break-Thru™ DA675 are examples of compounds of formula (I).

Break-Thru™ DA647 is Oxirane, phenyl, polymer with oxirane, monooctyl ether (CAS Number: 83653-00-3); it is also known as TEGO™ XP 11010 (from Degussa).

Break-Thru™ DA675 is Oxirane, 2-phenyl-, polymer with oxirane, mono(3,5,5-trimethylhexyl) ether (CAS Number: 303150-42-7); it is also known as TEGO™ VISCOPLUS 3030 and TEGO™ VISCOPLUS 3060 (from Degussa).

EXAMPLE 1

This example provides data relating to suspoemulsions (SEs) comprising ADEPIDYN™ (pydiflumetofen) suspended in water and propiconazole present as an oil-in-water emulsion. All the SE formulations were prepared and analysed for particle size using conventional processes familiar to those skilled in the art.

Table 1 provides, for each SE, a list of ingredients plus particle size data obtained during Freeze-Thaw (F/T) storage of the SE samples; a Freeze-Thaw cyclic stress test for physical storage of samples was used, whereby every 24 hours the storage freezer/oven/temperature was changed from −10° C. to 45° C. (and then back again 24 hours later). Under such extreme temperature change, stressed material may induce significant particle growth of active ingredients but, as Table 1 shows, this can be mitigated by the presence of a compound of formula (I).

TABLE 1

| Ingredients | ADE-1 | ADE-2 |
|---|---|---|
| Propiconazole | 12.5 | 12.5 |
| Adepidyn ™ | 15 | 15 |
| 1,2,3-Propanetriol | 3.7 | 3.7 |
| Butyl polyalkylene oxide block copolymer | 6.0 | 5.5 |
| Castor oil, ethoxylated | 8.0 | 8.2 |
| Lignosulfonic acid, sodium salt | 1.5 | 0.5 |
| Methyl methacrylate polymer with methacrylic acid and methoxy polyoxyethylene methacrylate | 1.0 | 0.8 |
| Break-Thru ™ DA647 | 0 | 2.2 |
| Magnesium aluminum silicate dispersion | 4.0 | 4.6 |

TABLE 1-continued

| Ingredients | ADE-1 | ADE-2 |
| --- | --- | --- |
| Biocides | 0.2 | 0.2 |
| Thickener | 3.9 | 3.9 |
| pH adjuster | 0.2 | 0.2 |
| Antifoam | 0.05 | 0.05 |
| Water | to 100% | to 100% |
| Initial Particle Size DV(95) μm | 7.2 | 7.1 |
| After 2 weeks F/T cycle: Particle Size DV(95) μm | 71.3 | 14.3 |
| Particle size increase factor | >10 times | 2 times |

Conclusion: Formulations ADE-1 and ADE-2 are extremely similar compositions, with the key difference being that ADE-2 contains Break-Thru™ DA647, which is absent in ADE-1; as Table 1 reveals, surprisingly the presence of Break-Thru™ DA647 significantly reduces the rate of particle growth (crystal growth).

EXAMPLE 2

This example provides data relating to fungicide suspoemulsions (SEs) comprising OXTP (oxathiapiprolin) suspended in water and MFX (mefenoxam) present as an oil-in-water emulsion. All the SE formulations were prepared and analysed for particle size using conventional processes familiar to those skilled in the art.

Table 2 provides for each SE a list of ingredients plus particle size data obtained during storage of the SE samples.

TABLE 2

OXTP/MFX Formulation and particle size growth over storage at 54° C.

| Ingredient | OXTP-1 | OXTP-2 | OXTP-3 | OXTP-4 | OXTP-5 |
| --- | --- | --- | --- | --- | --- |
| OXTP | 5 | 5 | 5 | 5 | 5 |
| MFX | 15 | 15 | 15 | 15 | 15 |
| Pluronic ™ PE10400 | 0.5 | 0.5 | 0.5 | 0.5 | 0.5 |
| Toximul ™ 8320 | 1 | 1 | 1 | 1 | 1 |
| Break-Thru ™ DA675 | 0 | 0.5 | 1 | | |
| Break-Thru ™ DA647 | 0 | | | 0.5 | 1 |
| Xanthan pregel | 20 | 20 | 20 | 20 | 20 |
| Xiamenter Antifoam 1510 | 0.1 | 0.1 | 0.1 | 0.1 | 0.1 |
| Water | 58.4 | 57.9 | 57.4 | 57.9 | 57.4 |
| Total | 100 | 100 | 100 | 100 | 100 |
| Initial Particle size Dv50 (μm) | 1.69 | 1.75 | 1.51 | 1.77 | 1.87 |
| Initial Particle size Dv95 (μm) | 6.44 | 5.12 | 5.01 | 6.74 | 6.84 |
| Particle size after storage at 54° C. 4 wk Dv50 (μm) | 5.32 | 1.94 | 1.54 | 2.80 | 2.87 |
| Particle size after storage at 54° C. 4 wk Dv95 (μm) | 12.07 | 5.27 | 5.39 | 5.62 | 6.14 |
| Dv50 growth after 54° C. 4 wk (%) | 215.5 | 10.6 | 2.0 | 58.2 | 53.5 |

Conclusion: Formulations OXTP-1 to OXTP-5 are extremely similar compositions, with the key difference being that Formulations OXTP-2 to OXTP-5 contain Break-Thru™ DA647 or DA675, which are absent in Formulation OXTP-1; as Table 2 reveals, surprisingly the presence of Break-Thru™ DA647 or DA675 significantly reduces the rate of particle growth (crystal growth).

EXAMPLE 3

This example provides data relating to fungicide suspension concentrates (SCs) comprising sedaxane suspended in water. All the SC formulations were prepared and analysed for particle size using conventional processes familiar to those skilled in the art. Table 3 provides for each SC a list of ingredients plus particle size data obtained during storage of the SC samples.

TABLE 3

Sedaxane Formulation compositions and their particle size growth.

| Ingredient | SDX-1 | SDX-2 | SDX-3 |
| --- | --- | --- | --- |
| Sedaxane | 5 | 5 | 5 |
| Rhodacal ™ DS10 Wetting agent | 0.2 | 0.2 | 0.2 |
| Toximul ™ 8320 dispersant | 1 | | |
| REAX ™ 100M dispersant | | 1 | |
| Break-Thru ™ DA-675 dispersant | | | 1 |
| Rhodiasolve ™ Polarclean (water miscible solvent) | 10 | 10 | 10 |
| Xanthan pregel | 25 | 25 | 25 |
| Xiamenter ™ Antifoam 1510 | 0.1 | 0.1 | 0.1 |
| Water | 58.7 | 58.7 | 58.7 |
| Total | 100 | 100 | 100 |
| Initial Particle size Dv50 (μm) | 3.3 | 3.3 | 3.3 |
| Particle size after storage at 50° C. 4 weeks. Dv50 (μm) | 5.4 | 7.48 | 3.33 |
| Dv50 growth after 50° C. 4 weeks. (%) | 62 | 127 | 1 |

Conclusion: Formulations SDX-1 to SDX-3 are extremely similar compositions, with the key difference being that they contain different dispersants; Formulation SDX-3 contains Break-Thru™ DA675, which is absent in Formulations SDX-1 and SDX-2, having been replaced by dispersants of different chemistry; as Table 3 reveals, surprisingly the presence of Break-Thru™ DA675 significantly reduces the rate of particle growth (crystal growth).

EXAMPLE 4

This example provides data relating to fungicide suspension concentrates (SCs) comprising azoystrobin suspended in water. All the SC formulations were prepared and analysed for particle size using conventional processes familiar to those skilled in the art.

Table 4 provides for each SC a list of ingredients plus particle size data obtained during storage of the SC samples.

TABLE 4

Azoxystrobin Formulation compositions and their particle size growth over storage at 50° C. for 4 weeks.

| Ingredient | AZ-1 | AZ-2 | AZ-3 |
|---|---|---|---|
| Azoxystrobin | 5 | 5 | 5 |
| Morwet ™ D425 Wetting agent | 0.3 | 0.3 | 0.3 |
| Toximul ™ 8320 dispersant | 1 | | |
| REAX ™ 100M dispersant | | 1 | |
| Break-Thru ™ DA-675 dispersant | | | 1 |
| Rhodiasolve ™ Polarclean (water miscible solvent) | 10 | 10 | 10 |
| Xanthan pregel | 25 | 25 | 25 |
| Xiameter ™ Antifoam 1510 | 0.1 | 0.1 | 0.1 |
| Water | 58.6 | 58.6 | 58.6 |
| Total | 100 | 100 | 100 |
| Initial Particle size, Dv50 (μm) | 1.16 | 1.16 | 1.16 |
| Particle size after storage at 50° C. 4 wk, Dv50 (μm) | 1.48 | 1.58 | 1.23 |
| Dv50 growth after 50° C. 4 wk (%) | 27.5 | 36.6 | 6.1 |

Conclusion: Formulations AZ-1 to AZ-3 are extremely similar compositions, with the key difference being that they contain different dispersants; Formulation AZ-3 contains Break-Thru™ DA675, which is absent in Formulations AZ-1 and AZ-2, having been replaced by dispersants of different chemistry; as Table 4 reveals, surprisingly the presence of Break-Thru™ DA675 significantly reduces the rate of particle growth (crystal growth).

The invention claimed is:

1. A composition, comprising:
   a liquid forming a continuous phase;
   a compound of formula (I)

$$R_1O[C(R_2)(H)C(R_3)(H)O]_nX \quad (I)$$

where $R_1$ is $C_{6-12}$ alkyl or is $C_{6-12}$ alkenyl;
   n is from 5 to 50;
   independently, each $[C(R_2)(H)C(R_3)(H)O]$ unit has both $R_2$ and $R_3$ being hydrogen or has one of $R_2$ and $R_3$ being hydrogen and the other being phenyl; provided that at least one $[C(R_2)(H)C(R_3)(H)O]$ unit has one of $R_2$ and $R_3$ being hydrogen and the other being phenyl; and X is hydrogen or is selected from $C_{1-4}$ alkyl;
   a surfactant which is not the compound of formula (I); and
   at least one agrochemical active ingredient selected from pydiflumetofen, oxathiapiprolin, and sedaxane,
   wherein the compound of formula (I) is present at a concentration of 0.1 to 10% by weight;
   wherein the at least one agrochemical active ingredient is solid; and
   wherein the composition exhibits a DV(95) particle size increase factor of no more than two after a 2-week freeze thaw cycle between −10° C. to 45° C.

2. The composition of claim 1, wherein X is hydrogen.

3. The composition of claim 1, wherein $R_1$ is $C_{6-12}$ alkyl.

4. The composition of claim 3, wherein $R_1$ is $C_{8-10}$ alkyl.

5. The composition of claim 1, wherein n is from 5 to 40.

6. The composition of claim 1, wherein the compound of formula (I) is a compound of formula (Ia)

$$R_1O[C(R_4)(H)C(R_5)(H)O]_r[CH_2CH_2O]_sX \quad (Ia)$$

where, independently, in each $C(R_4)(H)C(R_5)(H)O$ unit $R_4$ is hydrogen and $R_5$ is phenyl;
or $R_4$ is phenyl and $R_5$ is hydrogen; r is from 3 to 7; and s is from 3 to 7.

7. The composition of claim 1, wherein the compound of formula (I) is present at a concentration of 0.3 to 5% by weight.

8. The composition of claim 1, wherein the compound of formula (I) is present at a concentration of 0.5 to 2% by weight.

9. The composition of claim 1, wherein the compound of formula (I) is present at a concentration of 0.5 to 1% by weight.

10. The composition of claim 1, wherein the surfactant includes butyl polyalkylene oxide block copolymer.

11. The composition of claim 1, wherein the composition is a suspoemulsion.

12. The composition of claim 11, further comprising at least one of propiconazole or mefenoxam in the emulsion.

* * * * *